Nov. 14, 1961    H. F. PARKER ET AL    3,008,430
CHAIN CONVEYORS
Filed Jan. 5, 1959    2 Sheets-Sheet 2
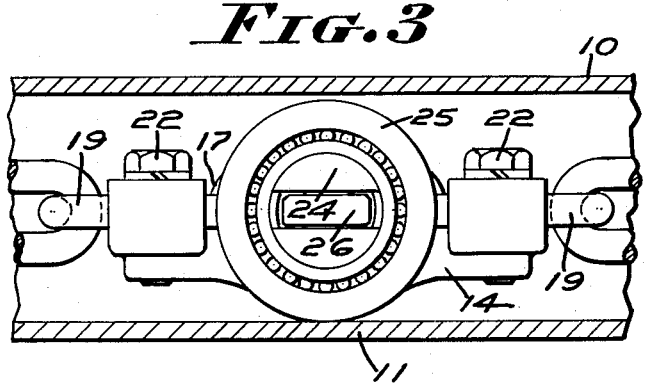
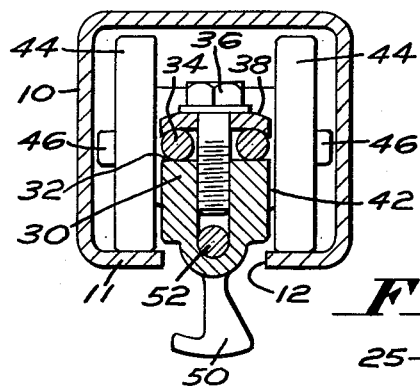
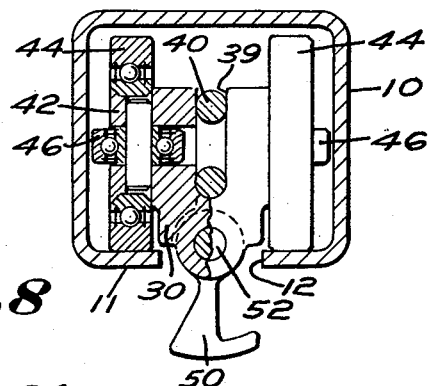
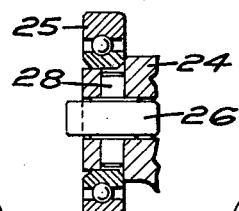
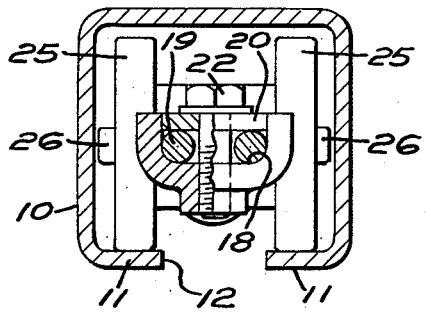
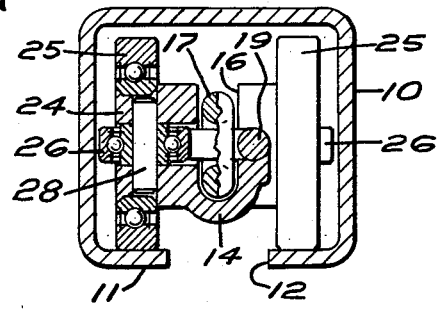
INVENTORS:
HUMPHREY F. PARKER
and ERFORD E. ROBINS
BY:
Beau, Brooks, Buckley & Beau,
ATTORNEYS.

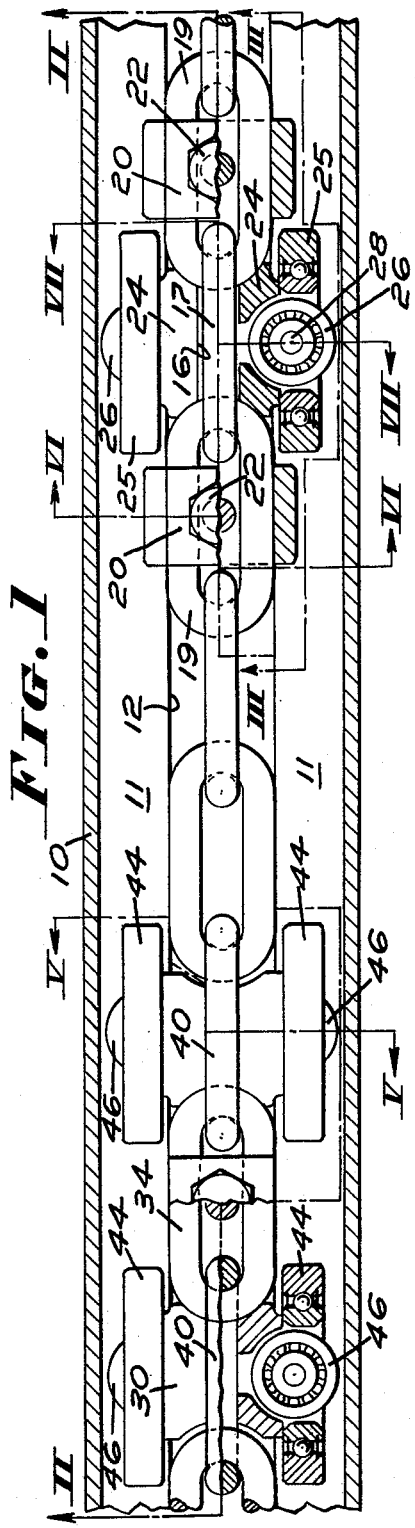
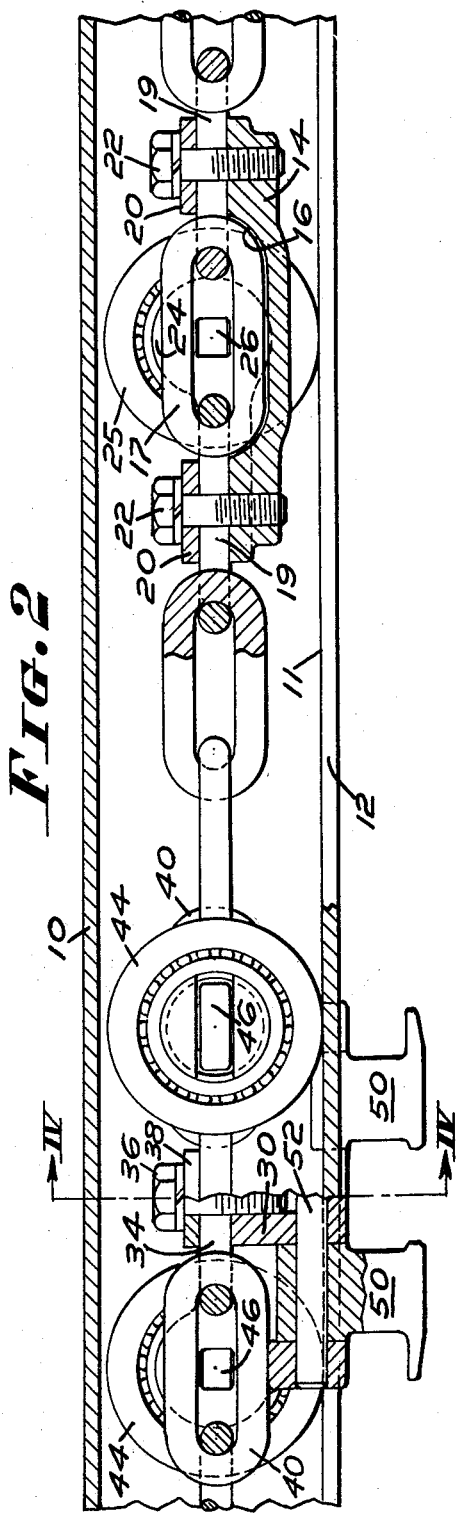

3,008,430
CHAIN CONVEYORS
Humphrey F. Parker, Buffalo, and Erford E. Robins, North Tonawanda, N.Y., assignors to Columbus McKinnon Corporation, a corporation of New York
Filed Jan. 5, 1959, Ser. No. 785,001
4 Claims. (Cl. 104—94)

This invention relates to chain-powered conveyors in which power chains are provided with load carrying hangers or pick-up means for moving trolleys, trucks or other objects along trolley rails, tracks, floorways, or the like; for example, as in manufacturing or warehousing operations. Such power chains may include interspersed wheeled drive and guide units to pick up and drive the loads and to rollingly support the chain in the track system. This invention is particularly concerned with improvements in such units when using chain of the welded link type.

One object of the invention is to provide improved attachment means for forming wheeled drive and guide units in a welded link chain-powered conveyor, for use in conveyor systems as aforesaid.

Another object of the invention is to provide improved attachment means for converting standard links of an endless welded link chain into wheeled links wherever desired through the length of the chain, without need for dismantling any parts of the chain.

Another object of the invention is to provide a novel wheeled carriage which may be added to or removed from an endless chain as aforesaid for the purposes described, said carriage being simple in design; easy to manufacture and assemble; and rugged and inexpensive to maintain.

Other objects and advantages of the invention will become apparent from the following specification, and the accompanying drawing wherein:

FIG. 1 is a fragmentary top plan view partly in section, of a conveyor power chain having devices of the invention attached thereto to provide both a drive link unit and a guide link unit;

FIG. 2 is a fragmentary side elevational view partially in section, taken on line II—II of FIG. 1;

FIG. 3 is a side elevational view of the guide link, taken on line III—III of FIG. 1;

FIG. 4 is a sectional view taken on line IV—IV of FIG. 2;

FIG. 5 is a view partially in section taken on line V—V of FIG. 1;

FIG. 6 is a view partially in section taken on line VI—VI of FIG. 1;

FIG. 7 is a view partially in section taken on line VII—VII of FIG. 1, and showing the construction in finally assembled form; and FIG. 8 is a fragmentary view corresponding to a portion of FIG. 7, illustrating a detail of the construction prior to the final assembly.

Conveying systems of the type to which this invention relates include flexible power chains running in either overhead or underground trackways, having load pick-up means extending from the trackway to engage load carrying hooks, racks, dollies, trolleys, or the like. For example, as shown herein the power chain supporting track is indicated at 10 to be of box-shaped cross section with the bottom wall thereof slotted as indicated at 12 to provide opposed track surfaces 11—11 upon which the power chain rollers run, so that the trackway is adapted for overhead conveyor use. However, the slot may be in the top or in either side wall of the track member, depending upon the relative position of the power chain and the work to be conveyed.

As stated hereinabove the invention contemplates a novel carriage which may be attached to standard type welded chain links to create wheeled drive link units and intermediate guide link units in an endless welded link chain. The guide link carriage, as seen in FIGS. 1, 2, 3, 6 and 7, comprises a cast metal body 14 having a centrally located longitudinal recess 16 in its upper surface, for receiving a vertical link 17 of the power chain. At each end the carriage is formed with enlarged flat recesses 18, 18 for seating therein the adjacent horizontal links 19 of the chain. Cap plates 20 are retained at each end of the carriage by means of vertical capscrews 22, and are thereby disposed to clamp down upon each enseated section of horizontal link and to thus complete the assembly of the carriage on the chain.

The carriage body 14 includes laterally extending stub axle portions 24 on which are mounted the inner races of vertically disposed ball-bearinged guide wheels 25—25. As shown herein, the outer end of each stub axle is slotted to receive a horizontally disposed guide roller 26, such as may be carried on a vertical pin 28 slip-fitted in a suitably apertured portion of the stub axle. These guide rollers extend beyond the outer faces of the vertical guide wheels, thus providing horizontal guidance.

Whereas, the guide link unit hereinabove described comprises a guide roller assembly of dual wheel form, the drive link unit of the conveyor as illustrated is of the four-wheeled type, so as to stabilize the unit against rocking thereof in the trackway such as might otherwise occur whenever the unit first engages a stationary load for load pick-up purposes. In this case, the carriage attachment components include a body casting designated 30 which is flatted as indicated at 32 at its central top surface portion to receive thereon a horizontal link 34 of the conveyor chain. The body portion is vertically drilled and tapped to accommodate a capscrew 36 to bear down against a cover plate 38 for clamping the horizontal chain link to the body 30. At its opposite ends the body 30 is vertically slotted as indicated at 39 to accommodate the next adjacent vertical links 40—40 of the conveyor chain.

The body member 30 is formed at opposite sides of its end portions with laterally extending stub axles 42 upon which are fitted the inner races of ball-bearinged vertical guide wheels 44—44. As shown in FIGS. 1, 2, 5, the stub axle portions 42 are horizontally slotted to accommodate therein horizontally disposed guide wheels 46—46.

As shown in FIG. 8, the stub shaft portions of the carriages are initially rounded and so dimensioned as to receive thereon in free slip-fitting relation the inner races of the vertical ball bearing wheels, and to thereupon slide over into covering positions above and below the ends of the pins mounting the horizontal guide wheels. Subsequently, the marginal edges of the stub shaft portions are "spun" or peened inwardly so as to overlap the slightly beveled edges of the inner races of the vertical wheels. This operation completes the assembly of the vertical and horizontal guide wheels relative to the carriage body. This operation applies to both the guide and drive unit carriage constructions.

Thus, it will be appreciated that the carriage parts of the drive link unit may be easily fabricated and quickly assembled upon the conveyor chain at any desired positions therealong, simply by first slip-fitting the body portion 30 upwardly around two vertical chain links until the central body portion abuts the bottom of the intermediately disposed horizontal link. The cover plate 38 is then placed on top of the horizontal link, and the capscrew 36 is then passed through the cover plate and threaded into the body 30 until the horizontal link is firmly clamped thereby to the carriage body.

As indicated at 50—50 load pick up lugs may be preassembled on the carriage body as by means of a pivot pin device as indicated at 52; it being understood that the specific load pick up lug arrangement as shown herein forms no essential part of the present invention, and that in lieu thereof any other suitable load engaging device may be employed.

Also, it will be understood that although only one form of the invention has been shown and described in detail, it will be apparent to those skilled in the art that the invention is not so limited but that various changes may be made therein without departing from the spirit of the invention or the scope of the appended claims.

We claim:

1. A wheeled carriage for attachment to a welded link conveyor power chain comprising, a cast metal body recessed longitudinally into its top surface to accommodate vertically disposed links of a welded link chain, detachable clamping means for holding said body to a next adjacent horizontally disposed link of said chain with said vertically disposed links carried within the recessing of said body, said body having stub axle portions cast integrally therewith and extending at opposite sides thereof, and guide wheels carried by said axle portions, said wheels being so mounted as to provide rolling support and guidance for said unit in both vertical and horizontal planes.

2. A wheeled carriage for attachment to a conveyor power chain comprising, a body recessed longitudinally into its top surface to accommodate vertically disposed links of a chain, detachable clamping means for holding said body to a next adjacent horizontally disposed link of said chain with said vertically disposed links carried within the recessing of said body, said body having stub axle portions cast integrally therewith and extending at opposite sides thereof, and paired vertically and horizontally disposed guide wheels carried by said axle portions, said wheels being so mounted as to provide rolling support and guidance for said unit in both vertical and horizontal planes.

3. A wheeled carriage for attachment to a welded link conveyor power chain comprising, a cast metal body recessed longitudinally into its top surface at its opposite ends to accommodate vertically disposed links of a welded link chain, detachable clamping means for holding said body to an intermediately positioned horizontally disposed link of said chain with said vertically disposed links carried within the recessing of said body, said body having stub axle portions cast integrally therewith and extending at opposite sides thereof, and guide wheels carried by said axle portions, said wheels being so mounted as to provide rolling support and guidance for said unit in both vertical and horizontal planes.

4. A conveyor power chain comprising a continuous welded link chain and a plurality of wheeled carriages attached to said chain, each carriage comprising a metal body recessed into its top surface to accommodate a vertically disposed link of said chain, detachable clamping means for holding said body to a next adjacent horizontally disposed link of said chain with said vertically disposed links carried within the recessing of said body, said body having stub axle portions extending at opposite sides thereof, and guide wheels carried by said axle portions.

References Cited in the file of this patent

UNITED STATES PATENTS

| | | |
|---|---|---|
| 881,908 | Demarest | Mar. 17, 1909 |
| 2,250,167 | Niles et al. | July 22, 1941 |
| 2,725,973 | King | Dec. 6, 1955 |

FOREIGN PATENTS

| | | |
|---|---|---|
| 713,556 | Germany | Nov. 10, 1941 |
| 738,491 | Germany | Aug. 18, 1943 |
| 1,091,940 | Germany | Nov. 3, 1954 |